United States Patent
Wang et al.

(10) Patent No.: US 12,120,793 B2
(45) Date of Patent: Oct. 15, 2024

(54) INTELLIGENT EMERGENCY POWER SUPPLY SYSTEM

(71) Applicant: Shenzhen SidrE Technology Co., Ltd, Guangdong (CN)

(72) Inventors: Shoufu Wang, Guangdong (CN); Yonggang Lv, Guangdong (CN)

(73) Assignee: SHENZHEN SIDRE TECHNOLOGY CO., LTD, Guangdong (CN)

( * ) Notice: Subject to any disclaimer, the term of this patent is extended or adjusted under 35 U.S.C. 154(b) by 14 days.

(21) Appl. No.: 18/204,962

(22) Filed: Jun. 2, 2023

(65) Prior Publication Data

US 2024/0155754 A1 May 9, 2024

(30) Foreign Application Priority Data

Nov. 4, 2022 (CN) .......................... 202211377860.8

(51) Int. Cl.
*H05B 47/105* (2020.01)
*F21S 9/02* (2006.01)
*H02J 7/00* (2006.01)

(52) U.S. Cl.
CPC ............ *H05B 47/105* (2020.01); *F21S 9/022* (2013.01); *H02J 7/0068* (2013.01)

(58) Field of Classification Search
CPC . H05B 47/105; F21S 9/022; F21S 9/02; H02J 7/0068; H02J 7/00
See application file for complete search history.

(56) References Cited

U.S. PATENT DOCUMENTS

2023/0021905 A1* 1/2023 Zaveruha .................. H02J 9/02

* cited by examiner

*Primary Examiner* — Robert L Deberadinis
(74) *Attorney, Agent, or Firm* — Ying-Ting Chen (57) ABSTRACT

An intelligent emergency power supply system including a power line, a signal communication module, an emergency power module and at least one luminaire, the luminaire is powered by the emergency power module in a state when the live line and the null line are not regularly powered, and the luminaire is capable of extracting the digital signals loaded on the live line and/or the null line and adjusting its own working mode according to control commands corresponding to the digital signals.

20 Claims, 5 Drawing Sheets

INTELLIGENT EMERGENCY POWER SUPPLY SYSTEM

BACKGROUND OF THE PRESENT INVENTION

Field of Invention

The present invention relates to field of emergency luminaire, more particular to an intelligent power supply system.

Description of Related Arts

Emergency luminaire is a kind of luminaire triggered by supply power for the active luminaire getting into outage or failure. Considering the factors including cost, installation, usage and so on, the current emergency luminaire is generally also used as a normal illuminating device in the same time. In regular condition, the emergency luminaire is supplied by the municipal electricity to function as the normal illuminating device, and in emergence condition, when the power supply for the normal illuminating device getting into outage or failure, the emergency luminaire shall be supplied by the battery or generator. There are mainly two kinds of current emergency power supply for emergency lighting system, one of which is centralized emergency power supply, the other is individual emergency power supply.

Figure 1A:
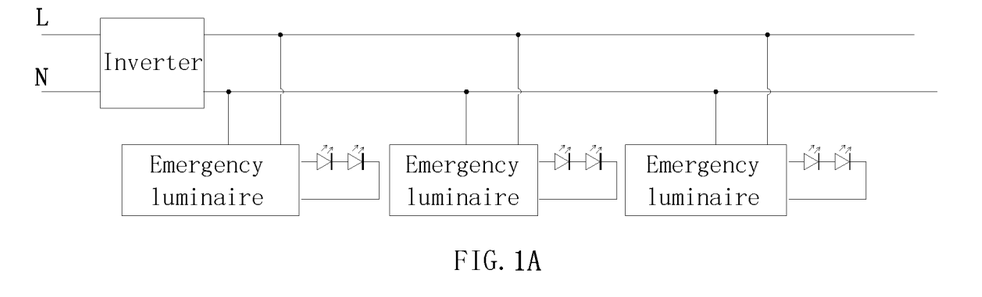
FIG. 1A is a perspective view of a conventional centralized emergency power supply.

Referring to FIG. 1A, one wiring method of current centralized emergency power supply is shown, in regular condition, the emergency luminaire is supplied by municipal power supply, and in emergence condition, the battery or generator power supply will be provided and inverted to the municipal voltage for the power supply of the emergency luminaire by the inverter, wherein the advantage of the kind of wiring is simple for wiring, but because in emergence condition, the emergency luminaire still maintain regular power level for operation, consuming a lot of power, it requires a high-efficiency inverter and a battery with large storage capacity or a generator with high power generation efficiency to maintain the operation of the emergency luminaire. So it is only applicable for large stadiums and other scenes with strict requirements for brightness. But in the emergence situation, especially in the emergency scene of fire or other disasters, the duration of emergency luminaire is more critical. The current emergency power supply is not able to flexibly control the working mode of the emergency luminaire, resulting that in emergence condition, all emergency luminaires are either in the same mode of brightness level to work continuously, or consuming the stored power before out of power, so that the function of emergency luminaires is not effectively working.

Figure 1B:
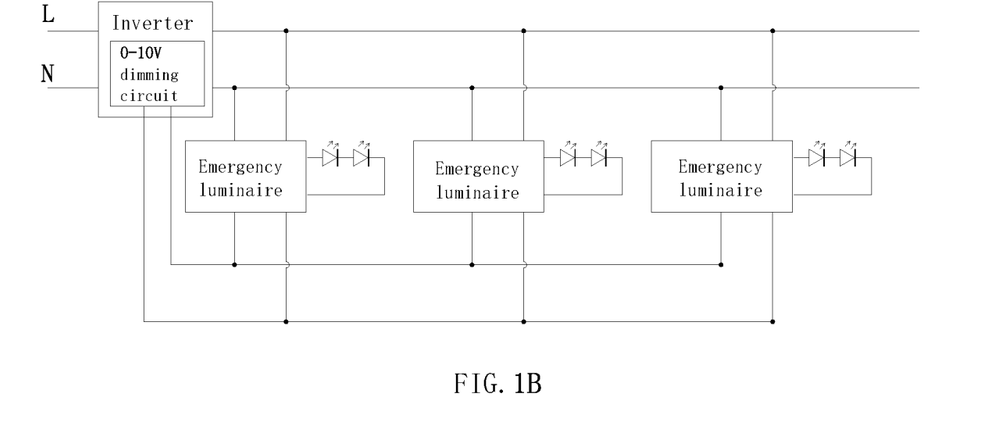
FIG. 1B is a perspective view of another conventional centralized emergency power supply.

Referring to FIG. 1B, another current centralized emergency power supply wiring method is illustrated. The inverter is set with 0-10V dimming circuit. In regular condition, the emergency luminaires are powered by the municipal power supply, wherein the inverter's 0-10V dimming circuit and the emergency luminaires' 0-10V port are disconnected, but in emergence condition, the inverter uses the 0-10V dimming circuit to adjust the power of the emergency luminaires to achieve the purpose of saving power consumption. But the inverter is still uniformly set to adjust the lighting power of the emergency luminaires, which cannot be flexibly adjusted according to the actual specific conditions, in order word, there is still an unreasonable situation that all emergency luminaires are either working continuously at the same set brightness level or consuming the stored power before losing power supply.

Figure 1C:
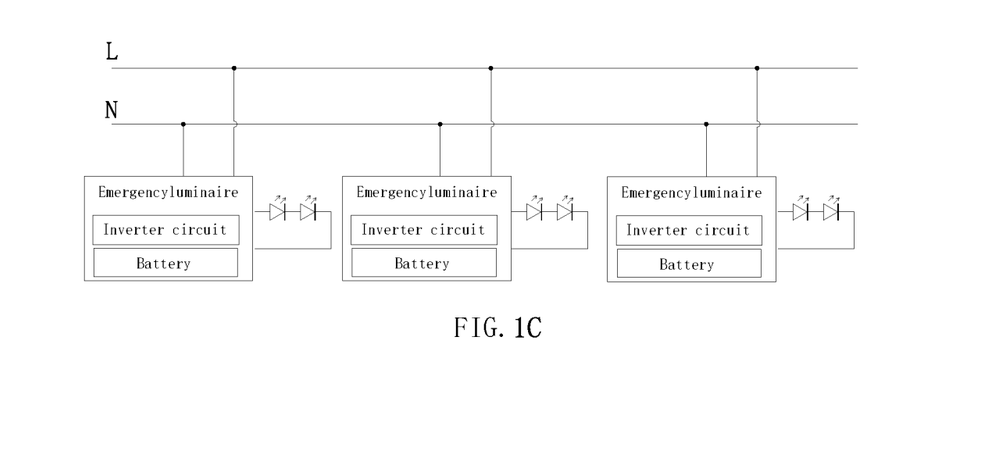
FIG. 1C is a perspective view of a conventional individual emergency power supply.

Referring to FIG. 1C, the current wiring of an individual emergency power supply is illustrated. Under the individual emergency power supply, the inverter circuit and the battery are built into the emergency luminaire. In regular condition, the emergency luminaire is powered by the municipal power supply, but in emergence condition, the emergency luminaire is powered by the battery inside. Compared with the centralized emergency power supply, the individual emergency power supply has stronger independence, however, the emergency power level of the current individual emergency power supply is fixed, for example, the power of the emergency luminaire is arranged to 30 W during regular lighting, and the power is fixed to 3 W during emergency lighting, which still cannot adjust the working mode of the emergency luminaire according to the actual using situation of the emergency luminaire.

In other words, the current emergency power supply can only maintain the work of all the emergency luminaires in the system according to the pre-setting, but cannot adjust the working mode of the emergency luminaire flexibly for the actual condition, so that when there is an emergence condition, it is impossible to control the work mode of the emergency luminaires according to the use scene of the emergency luminaires. But in the actual application, the users expect more to realize the intelligent control. At the same time, because the current emergency power supply can only control the work mode of all the emergency luminaires in the system. In the daily maintenance and repair, the staff can only unify the maintenance and repair of all the emergency luminaires in the system. For example, under the individual emergency power supply, they can only replace the battery inside the emergency luminaires based on the length of use of the battery, but can not flexibly and scientifically apply maintenance according to the condition of the emergency luminaires, the condition or capacity of the battery and so on, resulting that the corresponding maintenance costs are difficult to reduce.

At present, for the situation that the emergency luminaires can not be intelligently controlled, the solution provided in the prior art is generally to employ Bluetooth, WiFi or access by the network cable and another communication methods to archive the interaction between the system and the user, but the emergency luminaires are used in a variety of scenes. The wireless communication methods represented by Bluetooth and WiFi are easily interfered with and blocked by the building, while the wired communication methods have complex wiring problems. In an intelligent emergency power supply system, it is needed to arrange power lines and network cables, which means that wiring and line maintenance costs are significantly increased and it is difficult to be promoted and applied on a large scale.

SUMMARY OF THE PRESENT INVENTION

An object of the present invention is to provide an intelligent emergency power supply system, wherein the intelligent emergency power supply system achieves communication connection between the luminaire and the operating terminal without adding a special communication line, so as to guarantee the reliability of the communication connection between the luminaire and the operating terminal, and facilitate application and maintenance.

An object of the present invention is to provide an intelligent emergency power supply system, wherein the intelligent emergency power supply system can flexibly control the working mode of the luminaires according to the use of the luminaires, such as using different emergency power for the luminaires at different installation locations or adjusting the turning on or shutting down of the luminaires according to the account of present people therein, so as to meet the emergency function while saving electric energy based on the reasonable deployment of the luminaires and giving full play to the function of the luminaires.

An object of the present invention is to provide an intelligent emergency power supply system, wherein the intelligent emergency power supply system comprises a power line and a signal communication module, wherein the power line comprises a live line and a null line, wherein the signal communication module is electrically connected to the live line and the null line to load digital signals on the live line and/or the null line, and to receive the digital signals on the live line and/or the null line, so as to achieve corresponding communication connections by using the live line and/or the null line, thus eliminating the need for additional communication lines and enabling the quality of signal transmission by means of wired transmission.

An object of the present invention is to provide an intelligent emergency power supply system, wherein the intelligent emergency power supply system comprises an emergency power module and a luminaire, wherein the luminaire is electrically connected to the live line and the null line via the emergency power module, and is powered by the emergency power module in a state when the live line and the null line are not regularly powered (e.g. power failure or supply voltage is below a predetermined value).

An object of the present invention is to provide an intelligent emergency power supply system, wherein the luminaire comprises a drive circuit, a signal processing circuit and at least one emitting load device, wherein the drive circuit is electrically connected to the emergency power module to access electrical energy output from the emergency power module, so as to drive the emitting load device electrically connected to its output, wherein the signal processing circuit is electrically connected to the emergency power module to extract digital signals loaded on the live line and/or the null line and to control the operation of the driving circuit based on the corresponding signals, so as to achieve a reliable communication connection between the operating terminal and the luminaire without adding additional communication lines and to give full play to the function of the luminaire.

An object of the present invention is to provide an intelligent emergency power supply system, wherein the intelligent emergency power supply system loads corresponding digital signals for transmission on the live line and/or the null line, so as to avoid incurring additional wiring costs and line maintenance costs with the need for dedicated additional communication lines, and to ensure the quality of signal transmission based on the transmission of digital signals on the live line and/or the null line.

An object of the present invention is to provide an intelligent emergency power supply system, wherein the intelligent emergency power supply system uses the live line and/or the null line necessary for power supply of the luminaire for transmission of digital signals, and is thus capable of being universally adapted to current emergency power supply systems, in order words, by connecting the live line and the null line of an current emergency power supply system to the signal communication module respectively, and by configuring the luminaire of an current emergency power supply system with the signal processing circuit to transform the current emergency power supply system into the intelligent emergency power supply system, so as to facilitate the popularization and application of the intelligent emergency power supply system.

An object of the present invention is to provide an intelligent emergency power supply system, wherein the intelligent emergency power supply system breaks through the current thinking limitation that the intelligent upgrade of the emergency power supply system requires additional configuration of a wireless module for communication or a dedicated communication line in the system. By loading the digital signal in the live line and/or the null line way necessary for the power supply of the luminaires, the intelligent emergency power supply system achieves the signal transmission, so as to achieve the intelligence of the emergency power supply system, and to be universally adapted to the current emergency power supply system based on the simple transformation of the current emergency power supply system to achieve the intelligent upgrade of the current emergency power supply system.

An object of the present invention is to provide an intelligent emergency power supply system, wherein the signal processing circuit comprises a pre-processing unit and a control unit, wherein the pre-processing unit is arranged to step down the high voltage signal accessed from the live line and/or the null line, wherein the control unit is electrically connected to the pre-processing unit and is arranged to decode the signal processed by the pre-processing unit to obtain corresponding control signals, wherein the driving circuit is communicatively connected to the control unit to drive the emitting load device controlled by the corresponding control signals of the control unit.

An object of the present invention is to provide an intelligent emergency power supply system, wherein in the state of regular power supply of the live line and the null line, the luminaire is used as a regular lighting fixture by the emergency power module obtaining power supply of the live line and the null line, wherein in the state of irregular power supply of the live line and the null line, the luminaire is powered by the emergency power module and used as an emergency luminaire, so as to be more economical and environmentally friendly.

An object of the present invention is to provide an intelligent emergency power supply system, wherein the emergency power module comprises an energy storage unit, wherein the energy storage unit is electrically connected to the live line and the null line, wherein the energy storage unit is capable of being charged and storing in response to a state of regular power supply of the live line and the null line, and capable of outputting electrical energy in a state of emergency power supply of the live line and the null line, so as to power the luminaire by the emergency power module and used as a regular lighting fixture in the state of regular power supply of the live line and the null line, and to power the luminaire by the emergency power module and used as an emergency lighting fixture in the state of irregular power supply of the live line and the null line, so that the luminaire can be used as a regular lighting fixture and an emergency lighting fixture together, which is thus more economical and environmentally friendly.

An object of the present invention is to provide an intelligent emergency power supply system, wherein the intelligent emergency power supply system can stably achieve the transmission of digital signals, so that the working mode of the emitting load device can be adjusted based on corresponding control signals, such as achieving the adjustment to the emitting load device for brightness, color temperature, switching and so on, so as to achieve intelligent control of the emitting load device in the system, and to be able flexibly adjust the emitting load device according to actual using conditions, so as to meet the needs of user's intelligent control, which thus has a wide range of application prospects.

An object of the present invention is to provide an intelligent emergency power supply system, wherein the intelligent emergency power supply system comprises an isolation module, wherein the isolation module is provided at the front end of the live line and the null line to block the interference signal in the municipal power supply line from entering into the intelligent emergency power supply system and/or to block the digital signal in the intelligent emergency power supply system from escapin, so as to ensure the signal transmission quality of the intelligent emergency power supply system.

An object of the present invention is to provide an intelligent emergency power supply system, wherein the working mode of the driving circuit is loaded in the form of digital signals on the live line and/or the null line by the signal processing circuit and can be received by the signal communication module, so as to enable the user to obtain the working mode and address information of the luminaires, such as current, voltage, power and other parameter information, so as to facilitate the the user to maintain the luminaires in a timely and scientific manner based on the corresponding parameters, which helps to reduce the maintenance cost of the intelligent emergency power supply system.

According to an aspect of the present invention, the present invention provides an intelligent emergency power supply system, wherein the intelligent emergency power supply system comprises:

a power line, wherein the power line comprises a live line and a null line, a signal communication module, wherein the signal communication module is electrically connected to the live line and the null line to load digital signals on the live line and/or the null line, and to receive digital signals on the live line and/or the null line, an emergency power module, and a luminaire, wherein the luminaire is electrically connected to the live line and the null line via the emergency power module and is powered by the emergency power module in a state when the live line and the null line are not regularly powered, wherein the luminaire comprises a driver circuit, a signal processing circuit, and at least one illuminating load, wherein the driver circuit is electrically connected to the emergency power module to access electrical energy out from the emergency power module so as to drive the illuminating load electrically connected to an output of the driver circuit, wherein the signal processing circuit is connected to the emergency power module and the drive circuit so as to extract digital signals loaded on the live line and/or the null line and to control the operation of the drive circuit based on the corresponding signals.

In an embodiment, wherein the intelligent emergency power supply system comprises an isolation module, wherein the isolation module is provided at a front end of the live line and the null line to block interference signals in the municipal power supply line from entering the intelligent emergency power supply system and/or to block digital signals from escaping out of the intelligent emergency power supply system.

In an embodiment, wherein the signal processing circuit comprises a pre-processing unit and a control unit, wherein the pre-processing unit is arranged to access and step down the high voltage signal from the live line and/or the null line, wherein the control unit is electrically connected to the pre-processing unit and is arranged to decode the signal processed by the pre-processing unit to obtain a corresponding control signal, so as to control the drive circuit according to the corresponding control signal.

In an embodiment, wherein the emergency power module comprises an energy storage unit and an inverter circuit, wherein the energy storage unit is electrically connected to the live line and the null line and is arranged to be able to be charged and to store energy in response to a state of regular power supply of the live line and the null line, and be able to output electrical energy in a state of irregular power supply of the live line and the null line, wherein the inverter circuit is electrically connected to the energy storage unit, based on the corresponding parameter settings of the inverter circuit, to enable the luminaire to output the corresponding power according to the corresponding emergency settings in the state of irregular power supply of the live line and the null line.

In an embodiment, wherein the control unit is powered by and connected to the drive circuit so as to operate and be powered by the drive circuit.

In an embodiment, wherein the control unit is provided in the form of an integrated circuit.

In an embodiment, wherein the power line further comprises a ground line wherein the intelligent emergency power supply system is grounded and protected in a state when the intelligent emergency power supply system is connected to municipal power supply.

In an embodiment, wherein the emergency power module and the luminaire are separated and are provided in the form of a centralized emergency power supply.

In an embodiment, wherein the signal communication module and the emergency power module are integrated.

In an embodiment, wherein the emergency power module is built into the luminaire and is provided in the form of an individual emergency power supply.

These and other objectives, features, and advantages of the present invention will become apparent from the following detailed description, the accompanying drawings.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. Just indicate relations of direction or position are based on the relations of direction or position shown in the appended drawings, which is only to facilitate descriptions of the present invention and to simplify the descriptions, rather than to indicate or imply that the referred device or element must apply specific direction or to be operated or configured in specific direction. Therefore, the above-mentioned terminologies shall not be interpreted as confine to the present invention.

It is understandable that the term "a" should be understood as "at least one" or "one or more". In other words, in one embodiment, the number of an element can be one and in other embodiment the number of the element can be greater than one. The term "a" is not construed as a limitation of quantity.

In the description of the present invention, it should be noted that the terms "mounted," "connected," and "linked" should be understood in a general manner, which could be, for example, affixedly connected, detachably connected, or integrally connected. Unless expressly specified and defined otherwise, it may also be a mechanical connection, an electrical connection or may be in communication with each other; it may be directly connected or indirectly connected by means of an intermediate medium, and may be an interaction relationship between two or more elements inside the two elements. For a person of ordinary skill in the art, the specific meanings of the above terms in the present invention may be understood according to specific situations.

The present invention provides an emergency power supply system, wherein the emergency power supply system can achieve the communication connection between the luminaire and the corresponding operating terminal without the special communication line and the wireless transmission module for communication to reach the intelligent control of the luminaire according to the operation command of the operating terminal, so as to achieve the intelligence of the emergency power supply system and meet the user's demand for the intelligence of the emergency power supply system, which has a broad application prospect.

Figure 2A:
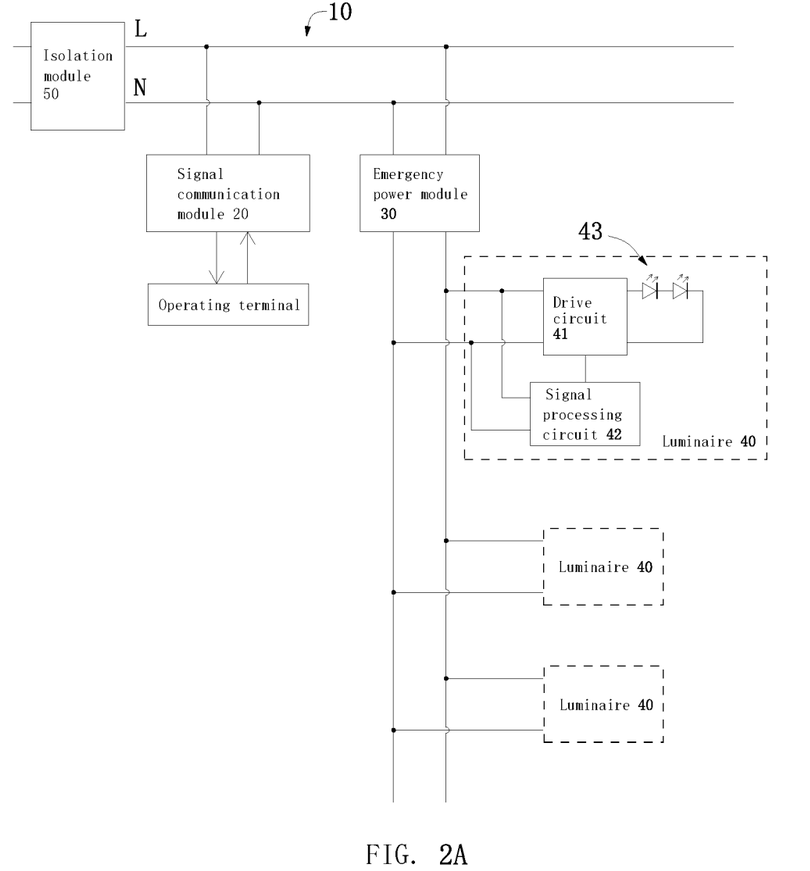
FIG. 2A is a diagram of the structure of an intelligent emergency power supply system according to an embodiment of the present invention.
Figure 2B:
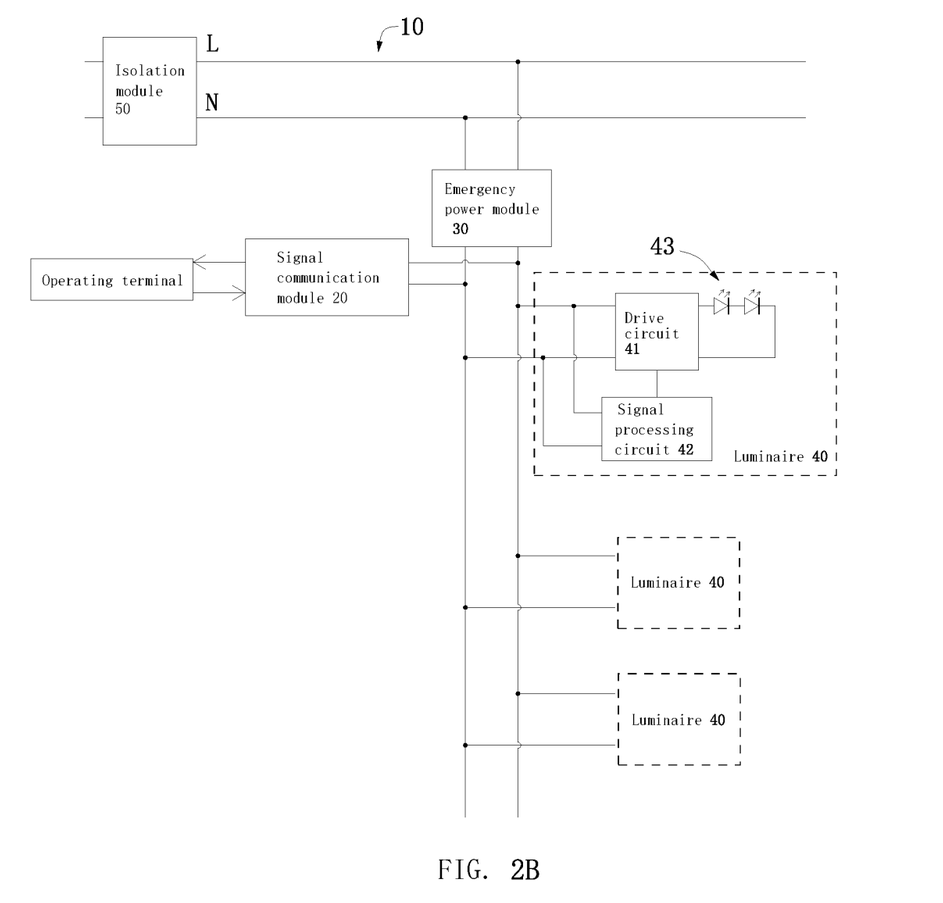
FIG. 2B is a diagram of an alternative embodiment of the structure of an intelligent emergency power supply system according to the above embodiment of the present invention.
Figure 3A:
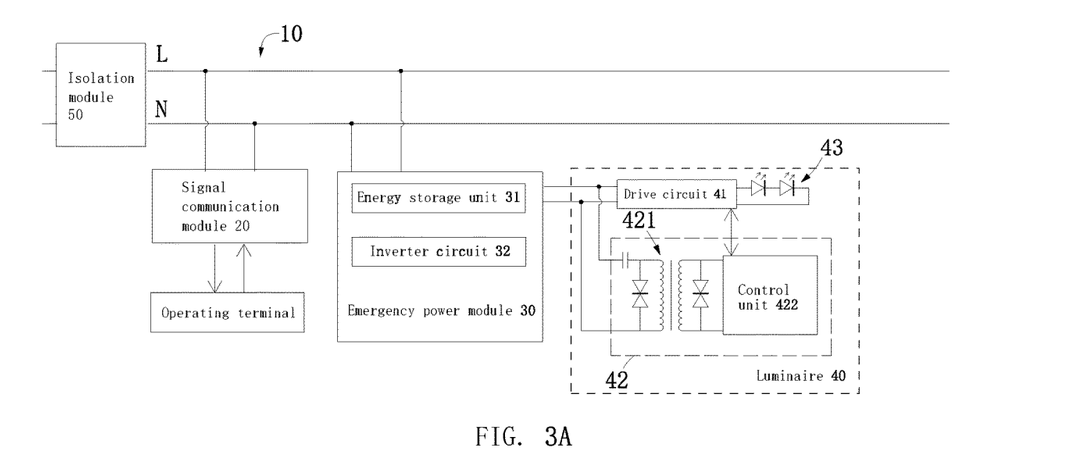
FIG. 3A is a diagram of the wiring of the intelligent emergency power supply system according to the above embodiment of the present invention.
Figure 3B:
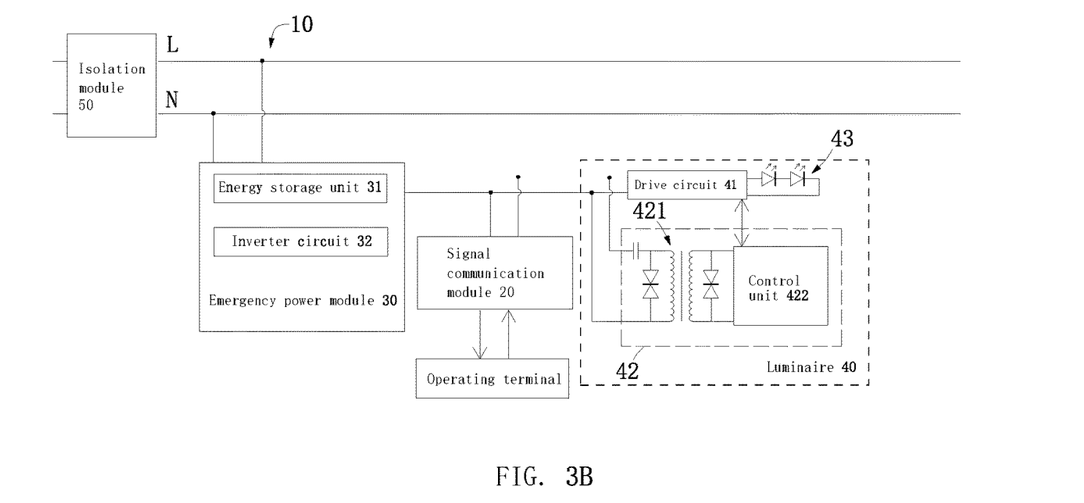
FIG. 3B is a diagram of the wiring of the intelligent emergency power supply system according to the above alternative embodiment of the present invention.

Referring to FIGS. 2A and 3B of the drawings of the specification of the present invention, an intelligent emergency power supply system according to an embodiment of the present invention is illustrated, wherein the intelligent emergency power supply system comprises a power line 10, a signal communication module 20, an emergency power module 30 and at least one luminaire 40, wherein the power line 10 comprises a live line L and a null line N, wherein the signal communication module 20 is electrically connected to the live line L and the null line N to load control commands from the operating terminal in the form of digital signals on the live line L and/or the null line N, and to receive digital signals loaded on the live line L and/or the null line N and transmit them to the operating terminal, wherein the luminaire 40 is electrically connected to the live line L and the null line N via the emergency power module 30, and in a state that the live line L and the null line N are not regularly powered (e.g. power failure or supply voltage is below a predetermined value), the luminaire 40 is powered by the emergency power module 30 and used as an emergency luminaire, wherein the luminaire 40 is able to extract the digital signals loaded on the live line L and/or the null line N and to adjust its working mode according to the control commands corresponding to the digital signals, so as to achieve a communication connection between the operating terminal and the luminaire 40 and to achieve intelligent control of the luminaire 40 without adding additional communication line or adding additional wireless communication module.

Specifically, wherein the luminaire 40 comprises a drive circuit 41, a signal processing circuit 42 and at least one illuminating load 43, wherein the drive circuit 41 is electrically connected to the emergency power module 30 to access electrical energy output from the emergency power module 30, so as to drive the illuminating load 43 electrically connected to its output, wherein the signal processing circuit 42 is connected to the emergency power module 30 and the drive circuit 41 to extract the digital signals loaded on the live line L and/or the null line N and to control the operation of the drive circuit 41 according to the control instructions corresponding to the digital signals, so as to achieve the adjustment of the operating state of the illuminating load 43, so as to achieve the intelligent control of the luminaire 40 without adding additional communication lines or adding additional wireless communication modules.

Further, wherein the signal processing circuit 42 comprises a pre-processing unit 421 and a control unit 422, wherein the pre-processing unit 421 is arranged to access and step down the high voltage signal from the live line L and/or the null line N, wherein the control unit 422 is electrically connected to the pre-processing unit 421 and is arranged to decode the signal processed by the pre-processing unit 421 to obtain the corresponding control signal, wherein the driving circuit 41 is communicatively connected to the control unit 422 to drive the illuminating load 43 controlled by the control unit 422 according to the corresponding control signal.

It is worth mentioning that the control unit 422 is provided in the form of an integrated circuit, such as being implemented as an MCU, so as to facilitate to simplify the circuit layout of the signal processing circuit 42 and to guarantee the processing performance and anti-interference capability of the signal processing circuit 42.

In particular, in this embodiment of the present invention, wherein the control unit 422 is electrically connected to the drive circuit 41 in order to obtain electrical power from the drive circuit 41 and to operate by the drive circuit 41 powering.

In some embodiments, wherein the electrical energy obtained by the drive circuit 42 is at first processed by the signal processing circuit 42 to extract digital signals on the live line L and/or the null line N to prevent damage or loss of digital signals to ensure the signal transmission quality of the intelligent emergency power supply system.

Further, wherein the working mode of the drive circuit 41 can also be loaded in the form of digital signals on the live line L and/or the null line N by the signal processing circuit 42 and can be received and transmitted to the operating terminal by the signal communication module 20 to enable the user to obtain the working mode and address information of the luminaire 40, such as current, voltage, power and other parameter information, so that user is to be able to adjust and maintain the luminaire 40 in a timely and scientific manner based on the corresponding parameters, which is conducive to improving the intelligence level of the intelligent emergency power supply system and reducing the maintenance cost of the intelligent emergency power supply system.

It is worth mentioning that the intelligent emergency power supply system loads the corresponding digital signals on the live line L and/or the null line N for transmission, in order to eliminate the need for dedicated additional communication lines to avoid additional wiring costs and line maintenance costs, and in order to eliminate the need for additional wireless communication modules, while transmitting the digital signals based on the live line L and/or the null line N. In a wired transmission, the signal transmission quality of the intelligent emergency power supply system is guaranteed by avoiding the inevitable interference and building blocking defects of the wireless transmission method.

In particular, wherein the intelligent emergency power supply system can ensure a reliable communication connection between the operating terminal end and the luminaire 40, so that corresponding to the use scene of the luminaire 40, the intelligent emergency power supply system can flexibly control the working mode of the luminaire 40 according to the use situation of the luminaire 40, such as the user can use different emergency power for the luminaire 40 in different installation positions through the operating terminal end or use different emergency power for the luminaire 40 according to the account of present people therein, that is, corresponding to the emergency state, based on the direction of the flow of people or the actual lighting area and other factors, adjustment is applied to the emergency power of the luminaire 40 in different installation positions, such as increasing the emergency power of the luminaire 40 at the gathering of people to improve the lighting brightness of the luminaire 40, or reducing the emergency power of the luminaire 40 in the unoccupied area or even shutting down, in order to save the electrical energy consumption of the luminaire 40 from the emergency power module 30, so as to meet the emergency function while saving the electrical energy consumption based on the reasonable deployment of the luminaire 40 and give full play to the function of the luminaire 40.

It is worth mentioning that, based on the present invention, wherein the intelligent emergency power supply system uses the live line L and/or the null line N necessary for power supply of the luminaire 40 for transmission of digital signals, and thus can be universally adapted to current emergency power supply systems, in order words, by connecting the live L line and the null line N of an current emergency power supply system to the signal communication module respectively, and by configuring the luminaire 40 of an current emergency power supply system with the signal processing circuit 42 to transform the current emergency power supply system into the intelligent emergency power supply system, so as to achieve a reliable intelligent upgrade of the existing emergency power supply system without adding additional wiring costs, and to facilitate the intelligent emergency power supply system popularization and application and to meet the intelligent demand for emergency power supply systems in the market.

In other words, wherein the intelligent emergency power supply system breaks through the thinking limitation that the intelligent upgrade of the emergency power supply system inherently requires additional configuration of wireless modules for communication or dedicated communication lines in the system, and achieves the transmission of signals by loading digital signals on the live line L and/or the null line N way necessary for power supply of the luminaires 40, so as to achieve the intelligence of the emergency power supply system, and to be universally adapted to the current emergency power supply system, which, based on the simple transformation of the existing emergency power supply system, achieves an intelligent upgrade of the current emergency power supply system to meet the market demand for intelligent emergency power supply system.

It is worth mentioning that in this embodiment of the present invention, wherein in the state of regular power supply of the live line L and the null line N, the luminaire 40 is powered via the emergency power module 30 from the live line L and the null line N and is used as a regular lighting fixture, wherein in the state of emergency power supply of the live line L and the null line N, the luminaire 40 is powered by the emergency power module 30, in other words, the the luminaire 40 is used as an emergency luminaire in emergency situations and as a regular lighting fixture in regular situations, so as to have a variety of uses and to make the the intelligent emergency power supply system more economical and environmental friendly.

Specifically, wherein the emergency power module 30 comprises an energy storage unit 31, wherein the energy storage unit 31 is electrically connected to the live line L and the null line N so that in a state of regular power supply to the live line L and the null line N, the energy storage unit 31 can be charged and stored, and in response to a state of emergency power supply to the live line L and the null line N, the energy storage unit 31 outputs electrical energy, so that in the state of regular power supply to the live line L and the null line N, the luminaire 40 is powered via the emergency power module 30 from the live line L and the null line N and is used as a regular lighting fixture, and in the state of irregular power supply to the live line L and the null line N, the luminaire 40 is powered by the electrical energy output from the energy storage unit 31 of the emergency power module 30 and is used as an emergency lighting fixture, which means that the luminaire 40 can be used as a regular lighting fixture and as an emergency luminaire, thus being more economical and environmental friendly.

It is worth mentioning that in this embodiment of the present invention, the emergency power module 30 also comprises an inverter circuit 32 electrically connected to the energy storage unit 31 to enable the luminaire 40, according to the corresponding parameter setting of the inverter circuit 32 in the state when the live line L and the null line N are not regularly powered, i.e. the state when the luminaire 40 is used as an emergency luminaire, can output the corresponding power according to the corresponding emergency setting, so as to ensure the working stability of the luminaire 40.

In particular, wherein the intelligent emergency power supply system reliably transmits digital signals via the live line L and/or the null line N, so as to be able to adjust the working condition of the illuminating load 43 based on the corresponding control signals, for example to perform different lighting effects based on the adjustment of the brightness, color temperature and the like of the illuminating load 43 when the luminaire 40 is used as a regular lighting fixture, in order to achieve intelligent control of the illuminating load 43 in the system, and at the same time in the process of the use of the luminaire 40, to flexibly adjust the working mode of the illuminating load 43 according to the actual use conditions, so as to meet the intelligent control needs of users, and therefore has a wide range of application prospects.

Further, in this embodiment of the present invention, wherein the intelligent emergency power supply system comprises an isolation module 50, wherein the isolation module 50 is provided at the front of the live line L and the null line N to block the interference signals in the municipal power supply line from entering the intelligent emergency power supply system, and/or to block the digital signals in the intelligent emergency power supply system from escaping, so as to ensure the signal transmission quality of the intelligent emergency power supply system.

It is worth mentioning that in some embodiments, wherein the power line 10 further comprises a ground line to protect the intelligent emergency power supply system by grounding the intelligent emergency power supply system when the intelligent emergency power supply system is connected to the municipal power supply. It is to be understood that the ground line may or may not be provided therein, in other words, the provision or non-provision of the ground line does not constitute a limitation of the present invention.

It is understood that the operating terminal is a communication device communicatively connectable to the signal communication module 20, such as but not limited to a cell phone, a computer, a smart watch and a remote control, etc., and that the communication connection between the operating terminal and the signal communication module 20 may be wireless or wired, and that the user is able to operate the luminaire 40 through the operating terminal, and optionally is also able to obtain the operating status of the luminaire 40 through the operating terminal and so on.

Figure 4:
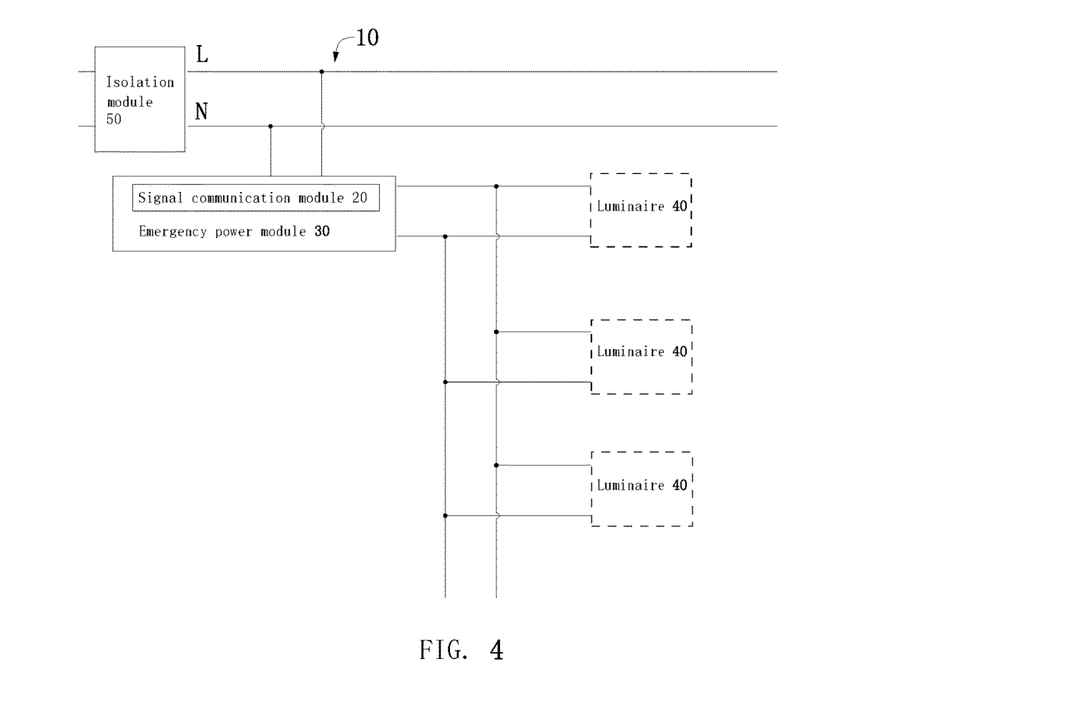
FIG. 4 is a diagram of the structure of the intelligent emergency power supply system according to an alternative mode of the above embodiment of the present invention.

Further, referring to FIG. 4 of the drawings of the present invention, an intelligent emergency power supply system according to an alternative mode is illustrated, wherein the signal communication module 20 and the emergency power module 30 are integrated to facilitate simplification of the wiring of the intelligent emergency power supply system, wherein the operating terminal can be implemented as a display or an operating control and so on, on the emergency power module 30 to facilitate the user to perform the corresponding operation.

Figure 5:
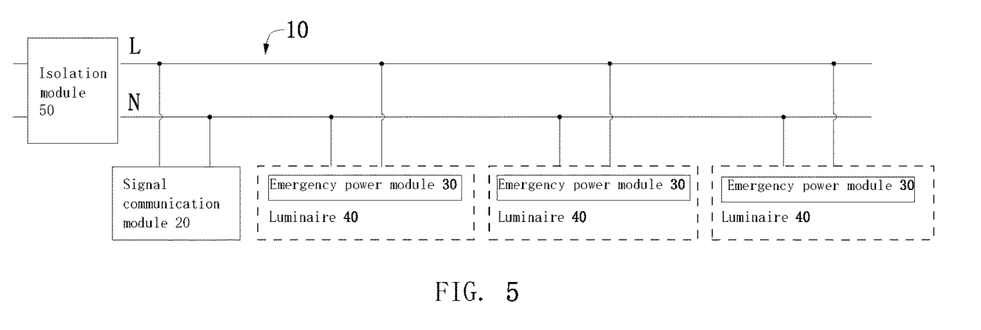
FIG. 5 is a diagram of the structure of the intelligent emergency power supply system according to another alternative mode of the above embodiment of the present invention.

It is worth mentioning that although the intelligent emergency power supply system provided by the above embodiments are in the form of separating of the emergency power module 30 and the luminaires 40, i.e. the intelligent emergency power supply system is provided in the form of a centralized emergency power supply, which does not mean that the intelligent emergency power supply system provided by the present invention can only be applied in a centralized emergency power supply. Specifically, with further referring to FIG. 5 of the specification of the present invention, an intelligent emergency power supply system according to another alternative mode is illustrated as shown in FIG. 5 of the drawings of the present invention, wherein the emergency power module 30 is built into the luminaire 40, so that the intelligent emergency power supply system is provided in the form of an individual emergency power supply.

In the description of this specification, reference to the terms "an embodiment," "some embodiments," "example," "specific example," or "some examples" means that the specific features, structures, materials, or characteristics described in connection with the embodiment or example are included in at least one embodiment or example of the invention.", or "some examples" means that the specific features, structures, materials, or characteristics described in connection with the embodiment or example are included in at least one embodiment or example of the present invention. In this specification, the schematic representation of the above terms need not be directed to the same embodiment or example. Moreover, the specific features, structures, materials, or characteristics described may be combined in a suitable manner in any one or more embodiments or examples. In addition, without contradicting each other, a person skilled in the art may combine and combine the different embodiments or examples described in this specification and the features of the different embodiments or examples.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and is subject to change without departure from such principles.

What is claimed is:

1. An intelligent emergency power supply system, comprising:
a power line, wherein said power line comprises a live line and a null line,
a signal communication module, wherein said signal communication module is electrically connected to said live line and said null line to load digital signals on said live line and/or said null line, and to receive digital signals on said live line and/or said null line,
an emergency power module, and
a luminaire, wherein said luminaire is electrically connected to said live line and said null line via said emergency power module and is powered by said emergency power module in a state when said live line and said null line are not regularly powered, wherein said luminaire comprises a driver circuit, a signal processing circuit, and at least one illuminating load, wherein said driver circuit is electrically connected to said emergency power module to access electrical energy from said emergency power module so as to drive said illuminating load electrically connected to an output of said driver circuit, wherein said signal processing circuit is electrically connected to said emergency power module and said drive circuit so as to extract digital signals loaded on said live line and/or said null line and to control the operation of said drive circuit based on the corresponding signals.

2. The intelligent emergency power supply system, as recited in claim 1, wherein said intelligent emergency power supply system comprises an isolation module, wherein said isolation module is provided at a front end of said live line and said null line to block interference signals in a municipal power supply line from entering said intelligent emergency power supply system and/or to block digital signals from escaping out of said intelligent emergency power supply system.

3. The intelligent emergency power supply system, as recited in claim 2, wherein said signal processing circuit comprises a pre-processing unit and a control unit, wherein said pre-processing unit is arranged to access and step down the high voltage signal from said live line and/or said null line, wherein said control unit is electrically connected to said pre-processing unit and is arranged to decode the signal processed by said pre-processing unit to obtain a corresponding control signal, so as to control said drive circuit according to the corresponding control signal.

4. The intelligent emergency power supply system, as recited in claim 2, wherein said emergency power module and said luminaire are separated and are provided in the form of a centralized emergency power supply.

5. The intelligent emergency power supply system, as recited in claim 4, wherein said signal communication module and said emergency power module are integrated.

6. The intelligent emergency power supply system, as recited in claim 2, wherein said emergency power module is built into said luminaire and is provided in the form of an individual emergency power supply.

7. The intelligent emergency power supply system, as recited in claim 3, wherein said emergency power module comprises an energy storage unit and an inverter circuit, wherein said energy storage unit is electrically connected to said live line and said null line and is arranged to be able to be charged and to store energy in response to a state of regular power supply of said live line and said null line, and be able to output electrical energy in a state of irregular power supply of said live line and said null line, wherein said inverter circuit is electrically connected to said energy storage unit, based on the corresponding parameter settings of said inverter circuit, to enable said luminaire to output the corresponding power according to the corresponding emergency settings in the state of irregular power supply of said live line and said null line.

8. The intelligent emergency power supply system, as recited in claim 3, wherein said control unit is powered by and connected to said drive circuit so as to operate and be powered by said drive circuit.

9. The intelligent emergency power supply system, as recited in claim 8, wherein said emergency power module is built into said luminaire and is provided in the form of an individual emergency power supply.

10. The intelligent emergency power supply system, as recited in claim 3, wherein said control unit is provided in the form of an integrated circuit.

11. The intelligent emergency power supply system, as recited in claim 3, wherein said emergency power module and said luminaire are separated and are provided in the form of a centralized emergency power supply.

12. The intelligent emergency power supply system, as recited in claim 11, wherein said signal communication module and said emergency power module are integrated.

13. The intelligent emergency power supply system, as recited in claim 3, wherein said emergency power module is built into said luminaire and is provided in the form of an individual emergency power supply.

14. The intelligent emergency power supply system, as recited in claim 7, wherein said emergency power module and said luminaire are separated and are provided in the form of a centralized emergency power supply.

15. The intelligent emergency power supply system, as recited in claim 7, wherein said emergency power module is built into said luminaire and is provided in the form of an individual emergency power supply.

16. The intelligent emergency power supply system, as recited in claim 14, wherein said signal communication module and said emergency power module are integrated.

17. The intelligent emergency power supply system, as recited in claim 1, wherein said power line further comprises a ground line, wherein said intelligent emergency power supply system is grounded and protected in a state when said intelligent emergency power supply system is connected to a municipal power supply.

18. The intelligent emergency power supply system, as recited in claim 1, wherein said emergency power module and said luminaire are separated and are provided in the form of a centralized emergency power supply.

19. The intelligent emergency power supply system, as recited in claim 18, wherein said signal communication module and said emergency power module are integrated.

20. The intelligent emergency power supply system, as recited in claim 1, wherein said emergency power module is built into said luminaire and is provided in the form of an individual emergency power supply.

* * * * *